Jan. 27, 1942.  A. V. PETTMAN  2,271,032
ROTARY CULTIVATOR
Filed June 15, 1940  2 Sheets-Sheet 2
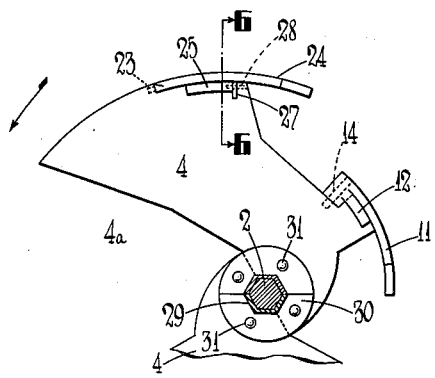
Fig-5-
Fig-6-
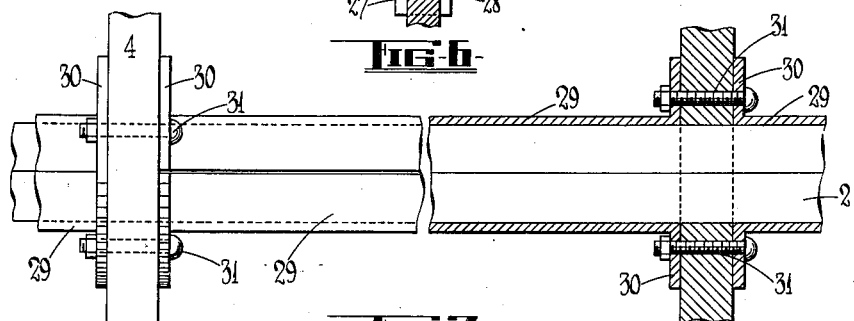
Fig-7-
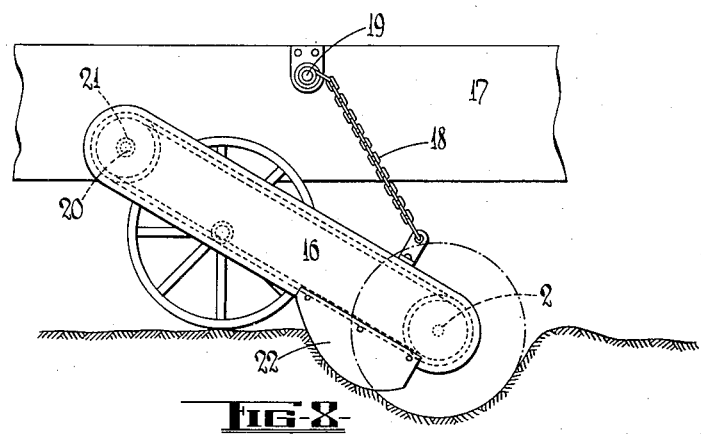
Fig-8-
Inventor,
A. V. Pettman
by Glascock Downing & Seebold
Attys.

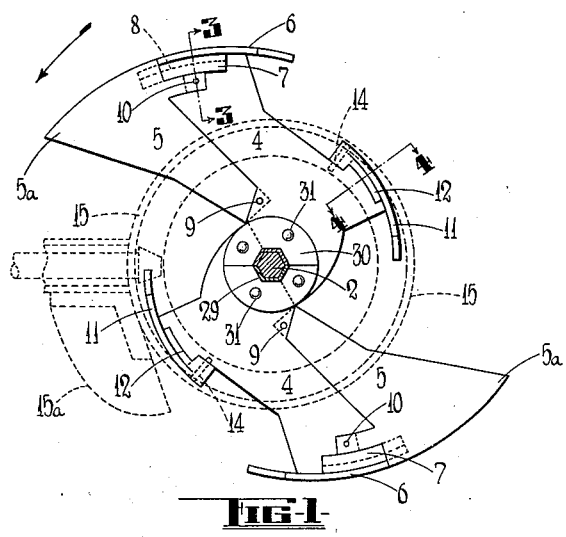
Fig-1-
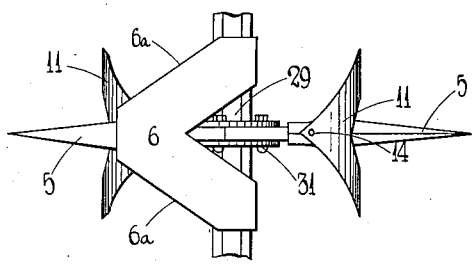
Fig-2-
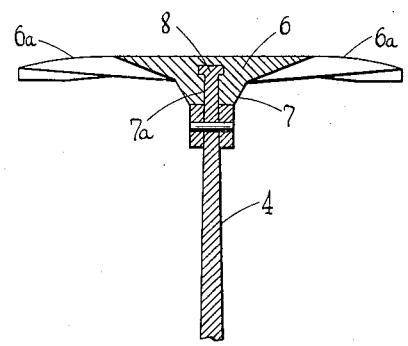
Fig-3-
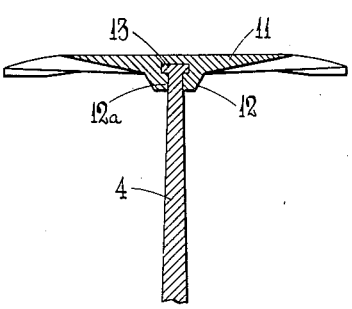
Fig-4-

Patented Jan. 27, 1942

2,271,032

UNITED STATES PATENT OFFICE 2,271,032

ROTARY CULTIVATOR

Albert Vinten Pettman, Epsom, Auckland, New Zealand

Application June 15, 1940, Serial No. 340,815
In New Zealand June 23, 1939

6 Claims. (Cl. 97—212)

The invention relates to rotary cultivators of the type having cutting edges on arms rotatable about a horizontal axis. The shaft on which said arms are mounted may be driven through gearing, either from a power unit on the implement of which the cultivators form part, or from the running wheels thereof.

An object of the invention is to provide an improved form of rotary cultivator unit, adapted to pierce, cut, and so deal with the ground in which it operates, that the latter will be broken up or cutivated in a better manner than heretofore, in addition to which the construction of the cultivator unit is such, that adjustment and replacement of the parts of which it is comprised, can be readily effected.

According to the invention, the improved cultivator unit comprises a hub adapted for mounting on a shaft to rotate therewith having radial arms extending from said hub with leading cutting edges on said arms to make cuts in the ground in the direction of rotation of the unit, and cross cutting edges which follow the leading cutting edges, and make cross cuts in the ground at right angles to the first made cuts.

Each unit aforesaid comprises, a plurality of radial arms with leading and following cross cutting edges thereon, spaced equidistantly through 360 degrees, and any desired number of units can be spaced along a common shaft, to rotate therewith. The shaft is preferably, but not necessarily flat sided, and the interior surfaces of the hubs of the units are correspondingly formed to fit on the shaft.

The invention will however be more particularly described with the aid of the accompanying drawings, in which Figure 1 is an elevation of one form of the improved cultivator unit, and Figure 2 is a plan view thereof, while Figure 3 is a detail sectional view taken on the line 3—3, Figure 1, Figure 4 a detail sectional view taken on the line 4—4, Figure 1, Figure 5 a part elevation, illustrating an alternative form of the cultivator unit, Figure 6 a detail sectional view taken on the line 6—6, Figure 5, Figure 7 a part elevation and part sectional elevation showing rotary cultivator units spaced along a shaft and bolted to spacers thereon, while Figure 8 illustrates an arrangement whereby the shaft which carries the cultivator units can be made to float.

As illustrated the hub of the improved rotary cultivator unit is preferably formed with a flat sided opening therethrough, to enable it to be mounted and secured on a flat sided shaft 2 to rotate therewith. The hub is also preferably split in order that it can be placed on the shaft 2 so that the radial arms 4 which extend from the hub, are disposed opposite each other.

The arms 4 are in the form of plates or webs, which move edgeways through a vertical plane when the unit is rotated in the direction indicated by the arrow, the leading edge of each arm 4 having secured thereto a cutter 5 also adapted to move edgeways through a vertical plane.

The leading edge of the cutter 5, is sharpened for use as a cutting edge, and is also provided with a pointed or beak formation 5a at its outer extremity.

At the outer end of each radial arm 4 there is provided a cross cutter 6, which follows behind the leading cutter 5, where the same projects beyond the outer end of the arm 4.

The following cross cutter 6 is preferably of approximately triangular formation and is given a convex curve which extends from its apex or forward point, to its rear edge, the diverging edges 6a of said cross cutter 6, being formed as cutting edges.

Each cross cutter 6 has on its inner side lugs 7 (Figures 1 and 3) having inturned ends 7a adapted to be passed upon a shouldered and forwardly tapered frog 8 on the outer end of an arm 4, from the forward or narrow end of said frog 8. Each cross cutter 6 is adapted to be retained on an arm 4 by the cutter 5 where the latter extends beyond the arm 4, and when the cutter 5 is secured to the hub, and to the arm 4 by having its inner end recessed into and bolted to the former, at 9, and being also bolted to the arm 4 at 10.

A secondary following cross cutter 11 of triangular form is also provided on the rear edge of each radial arm 4 between the hub and the outer end of said arm. The secondary cutter 11 is provided on its inner side with lugs 12, Figures 1 and 4, having inturned ends 12a adapted to pass upon a shouldered and forwardly tapered frog 13 on the arm 4, from the forward or narrow end of said frog, and being held against forward movement on the latter by being bolted to the arm 4 at 14.

As many complete units as may be found necessary or practicable are spaced along a shaft 2 by suitable spacers and clamped or otherwise secured in position on said shaft to rotate therewith, with the arms 4 in or out of alignment as required.

In operation, the leading cutters 5, enter the ground and make vertical cuts therein to the depth required, following which the cross cutters 6 and 11 enter the ground and make cross cuts at right angles to the vertical cuts, said cross cuts going well below the surface of the ground.

The forward points of the following cross cutters 6 and 11 are set further from the centre of the rotary unit, than the rear edges of said cutters 6, 11, so that the cutting edges of the latter are constantly presented to the ground which is broken and dealt with thereby.

The shaft 2 can be driven through any suitable form of gearing, and when the latter is enclosed in a dust proof casing as indicated at 15 in Figure 1, a coulter or cutter 15a can be provided in advance thereof to make a cut in the ground, and facilitate the passage of the casing 15 therethrough.

As illustrated in Figure 8 the shaft 2 on which the rotary units are mounted can be made to float, by being suspended by means of arms 16 pivotally attached to the chassis 17 of the implement. The maximum depth at which the rotary units operate is determined by chains 18 connected to the arms 16 near the lower ends thereof and to a cross shaft 19 on said chassis 17, the chains 18 being shortened or lengthened as required, by being wound on, or unwound from, the shaft 19 by suitable means provided on the chassis 17. This arrangement leaves the rotary units free to lift over obstacles without damage to parts, and if the power to the shaft 2, is transmitted through gearing from a power shaft 20 running through a sleeve 21 on which the arms 16 pivot, the rotary units are enabled to pivot about the shaft 20 without affecting any drive or drives therefrom.

When the arrangement illustrated in Figure 8 is used coulters or cutters 22 are provided on the arms 16 in advance of the lower ends of the latter, to make cuts in the ground, for the purpose of facilitating the passage through the latter of said lower ends.

The cross cutters 6 and 11 are curved to the radius of the perimeter of the circle formed by the rotating points at their apexes, said cutters 6 and 11 however being set so that their rear edges describe circles having smaller diameters, than the diameters of the circles described by their leading portions.

In the form of unit illustrated in Figure 5 the separate leading cutters are dispensed with, and the forward or leading edge 4a of each arm 4 is made as a cutting edge from which the arm 4 increases in thickness towards its rear edge.

The outer ends of the arms 4 are as before, each given a pointed or beak formation, at the rear of which is provided a recess 23 to receive the apex or forward end of a curved triangular shaped cross cutter 24. The cross cutter 24 is provided on its inner side with lugs 25 (Figure 6) having inturned ends 25a, and adapted to pass upon a shouldered frog 26 on the arm 4, in this form however from the back end of the latter. The cross cutter 24 is retained on the arm 4 preferably by a wedge 27 inserted in registering holes in the frog 26 and lugs 25 and secured by a stud 28.

Units comprising radial arms 4 carrying leading cutters 5 and following cross cutters 6 and 11 as described, can be spaced along a shaft 2 by means of split spacers 29 (Figure 7) provided at their ends with lugs or flanges 30 through which and the hubs of the units, bolts 31 are passed so as to secure the parts together on the shaft 2.

The radial arms 4 can be formed integral with the hubs or be formed separately from same and be attached thereto, by bolts or other means, also the spacers 29 can if desired be formed in one piece and be slipped on the shaft 2 from an end thereof.

Although the hubs have been described as having been fitted on the shaft 2 by being bolted or otherwise secured thereon, they can be permanently secured on the shaft by being welded thereon, and the arms 4 fitted and bolted thereto as described.

What I do claim and desire to obtain by Letters Patent of the United States of America is:

1. A rotary cultivator unit comprising, a rotatable shaft, a hub mounted on said shaft to rotate therewith, a radial arm extending from said hub, a leading cutting edge on said arm to make a cut in the ground in the direction of rotation of said arm, a shouldered frog on said radial arm, a plate having lugs with inturned ends embracing said shouldered frog, means maintaining the lugs on said frog, and cross cutting edges carried by said plate for making cross cuts in the ground substantially at right angles to the first cut.

2. A rotary cultivator unit comprising, a rotatable shaft, a hub mounted on said shaft to rotate therewith, a radial arm extending from said hub, a leading cutting edge on said arm to make a cut in the ground in the direction of rotation of said arm, a shouldered frog on said radial arm, a plate having lugs with inturned ends embracing said shouldered frog, means extending through registering holes in the frog and the lugs to maintain the lugs on the frog, a stud for maintaining said means in said holes, and cross cutting edges carried by said plate for severing the ground in substantially right angles to the first cut.

3. A rotary cultivator unit according to claim 1 wherein the shouldered frog is tapered and the lugs are correspondingly tapered to pass thereon from the narrow end of the frog.

4. A rotary cultivator unit comprising, a rotatable shaft, a hub mounted on said shaft for rotation therewith, circumferentially spaced radial arms extending from said hub, a leading cutting edge carried by each arm for vertically cutting the ground, a plate secured to each arm rearwardly of the leading cutting edge, lateral cutting edges on each plate for severing the ground at right angles to the cuts provided by the leading cutting edges of the arms, an auxiliary plate secured to each arm rearwardly of the first plate and radially inwardly of the first plate, and lateral cutting edges on the auxiliary plates for further severing the ground transversely of the cuts provided by the leading cutting edges of said arms.

5. A rotary cultivator unit comprising, a rotatable shaft, a split hub mounted on said shaft for rotation therewith, circumferentially spaced radial arms extending from said hub, a beakshaped leading cutting edge carried by each arm for cutting the ground in the plane of said arms, a triangular-shaped plate secured to each arm with the apex thereof positioned rearwardly of the leading cutting edge of each arm, lateral cutting edges on each triangular plate for severing the ground at right angles to the cuts provided by the leading cutting edges of the arms, an auxiliary triangular-shaped plate secured to each arm rearwardly of the first triangular-shaped plate and positioned radially inwardly of the first plate, and lateral cutting edges on the auxiliary triangular-shaped plates for further severing the ground transversely of the cuts provided by the leading cutting edges of the arms.

6. A rotary cultivator unit comprising, a rotatable shaft, a hub mounted on said shaft for rotation therewith, a radial arm carried by said hub, a beak-shaped leading cutting edge carried by said arm for cutting the ground in a substantially vertical plane, a plate mounted on said arm in a position radially inwardly with respect to the outermost end of the leading cutting edge, and lateral cutting edges on said plate for severing the ground substantially at right angles to the cut provided by said leading cutting edge.

ALBERT VINTEN PETTMAN.